July 27, 1926.
M. B. OLSEN
FISHING BOB.
Filed March 25, 1921
1,593,593
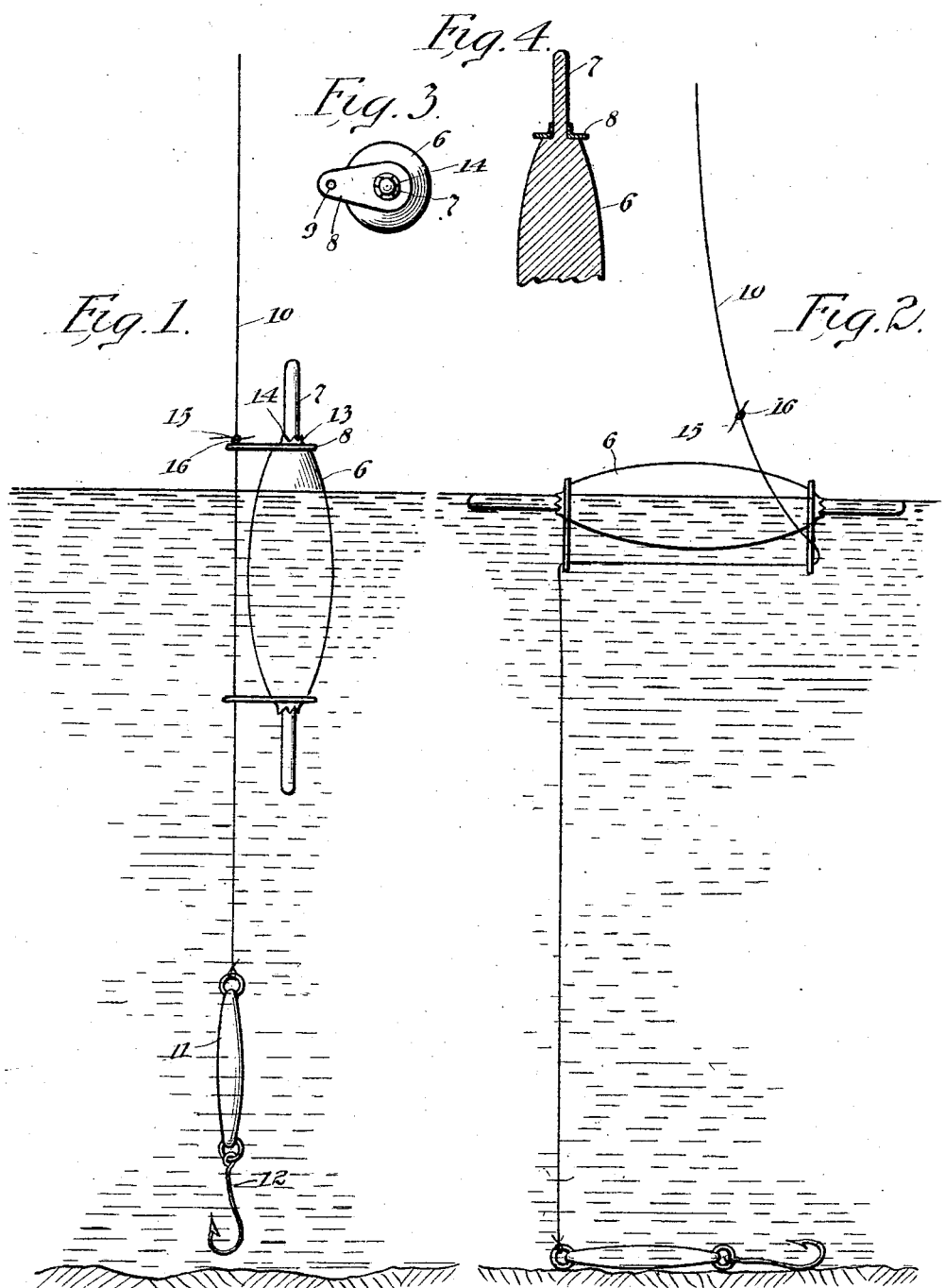

Patented July 27, 1926.

1,593,593

UNITED STATES PATENT OFFICE.

MARIUS B. OLSEN, OF CHICAGO, ILLINOIS.

FISHING BOB.

Application filed March 25, 1921. Serial No. 455,619.

This invention relates to improvements in fishing bobs for suspending a fish hook by its line above the bottom of a body of water in the course of fishing, which bobs have heretofore been secured to the line and against movement thereon during the operation of casting by hand or with a rod and, for their adjustment to depth, require the exercise of manual force, with the result that when throwing or casting the hook into the water, the line frequently becomes entangled with the hook and also the sinker therefor when used.

The object of my invention broadly stated, is to provide a fishing bob with means by which the bob is at all times free to run on the line so that, during the act of casting, the bob will locate itself in close proximity to the hook until it strikes the surface of the water, followed by the line running freely past the bob until the hook strikes the bottom for the water or else is suspended above the same when the bob comes in contact with a stop applied to the line and whereby the possibility of the line becoming entangled with the hook or its sinker, as may be, is prevented.

A further object of my invention is to have on the line an adjustable stop for the bob and distinguished from a stop for the same purpose secured to the bob.

Another object of my invention is to have a cheap, simple and effective means adapted to connect a bob with a fishing line, providing for a free and unobstructed sliding movement of the bob and the line with an adjustable stop which may be formed from a short piece from the line.

With these ends in view, my invention finds embodiment in certain features of novelty in the construction, combination and arrangement of parts by which the said objects are attained, all as hereinafter fully described with reference to the accompanying drawings and more particularly pointed out in the claims.

In said drawings,—

Fig. 1 illustrates, in side elevation, a fishing bob, line and stop in their operative fishing position in which my invention finds its embodiment.

Fig. 2 illustrates a similar view of the bob, line, sinker and hook, showing the inoperative position of the bob on the surface of the water following the casting of the hook, and which the bob has before it is adjusted to its operative position.

Fig. 3 is a detail top plan view of the bob and the attachment thereto of one of the guides for the line; and Fig. 4 is a detail longitudinal section through the bob and one of the guides therefor.

Similar characters of reference indicate the same parts in the several figures of the drawing.

The bob 6 and spindle 7—7 at opposite ends thereof are, and may be of any ordinary commonly used construction, to the opposite ends of which are sleeved on and secured adjacent the base of the spindles, flat plates 8—8, one end of which projects laterally beyond the sides of the bob, provided adjacent the ends thereof with perforations 9, forming an unobstructed guideway for line 10, to the free end of which is secured a sinker 11, connected with a fish hook 12, in the usual manner.

For attaching the plates 8—8 and locating them next the ends of the bob, plates 8 are each provided on their outer surfaces with a flange 13 surrounding the opening through which the spindles are projected, each of which flanges preferably converges to its outer edge for tightening the plates on the spindles and may be provided with teeth 14 for resisting the tendency of the movement of the plates away from the end of the bob, and which is effectively prevented by the digging of the teeth, so to speak, in the sockets.

My invention, however, is not limited to the spindle form of the guide plates or to the means shown for securing the line to the spindles or the bob against accidental detachment, although the form of the line guides and the means for securing them to the bob are preferred because of their simplicity and cheapness of construction, convenience and quickness of their attachment.

Another and important feature of this invention is an adjustable stop for the bob, consisting of a string 15, surrounding and secured to the line 10 by a knot 16 and of sufficient tightness on the line to prevent its displacement by the bob, and yet loose enough to be manually adjusted thereon.

It will now be seen that, with the bob running loosely on the line when casting the hook into the water, the gravity of the bob and the force due to the cast will cause the bob to move to contact with the sinker 11 or the eye thereof, as may be, and this whether or not the stop is in its adjusted position, as shown in Fig. 1, or non-adjusted position for depth, as shown in Fig. 2, and that the bob will float on the surface of the water on its side, as shown in Fig. 2, until it comes in contact with the stop secured to the line, followed by the running of the line through the bob guides until the line stop comes in contact with the plate upon the upper end of the bob, which it will do and assume its operative position only when the line stop prevents the hook or its sinker or both from striking the bottom for the water.

When, on the other hand, the line stop is beyond the bob guide plate, as shown in Fig. 2, and the hook or its sinker or both are lying on the bottom for the water, the bob will remain floating on its side and in so doing informs the fisherman of this fact and that the line stop must be adjusted to a position further down on the line.

The tautness of the line running through the two spaced guides, during the descent of the weighted hook, operates to maintain the bob from assuming a horizontal position on the water until the hook strikes the bottom and imparts to the fisherman an approximate idea of the depth of the water or so nearly so that he never need make more than two or three casts for locating the bob in its operative position for suspending the hook the correct distance above the water.

In this connection it is to be observed that not only is the casting of the hook facilitated by having the bob running freely on the line between the hook and a sinker, as may be, located, as it commonly is, next the hook, or but a very short distance therefrom, but that a means is thereby provided for reeling all of the line up to the end of a rod, except the very short length thereof occupied by the bob, the hook and the sinker, when the latter is used.

From the foregoing it will now be understood that my invention broadly includes a fishing bob, provided with unobstructed guides for a line on which the bob is free to run, regardless of the length of line between the hook and a stop located on the line above the bob, and whereupon, during the act of throwing or casting the hook, the bob assumes a position on the line adjacent the hook, preventing the entanglement of the hook with the line and the bob, utilizing the bob for accuracy in casting, and increasing the distance of the cast.

Having described my invention, what I claim and desire to secure by Letters Patent is:

1. A fishing bob, provided with plates detachably secured adjacent the opposite ends thereof, having therein free and unobstructed guides for a line, and means for securely connecting said plates at the adjacent ends of the bob.

2. A fishing bob, provided at opposite ends with spindles, a plate sleeved upon and secured to each of said spindles, provided with perforations alined in a plane beyond the bob, a line passing unobstructedly through said perforations, and an adjustable stop on said line for maintaining the bob in its operative upright position in water.

In witness whereof, I have hereunto set my hand and affixed my seal, this 19th day of March A. D. 1921.

MARIUS B. OLSEN. [L. S.]